US009437101B2

(12) United States Patent
Röhr

(10) Patent No.: US 9,437,101 B2
(45) Date of Patent: Sep. 6, 2016

(54) SYSTEM, TRANSMITTING DEVICE, RECEIVING DEVICE, AND METHOD FOR THE WIRELESS CONTROL OF AN RC MODEL

(76) Inventor: Ulrich Röhr, Hanau (DE)

( * ) Notice: Subject to any disclaimer, the term of this patent is extended or adjusted under 35 U.S.C. 154(b) by 194 days.

(21) Appl. No.: 14/111,411

(22) PCT Filed: Mar. 20, 2012

(86) PCT No.: PCT/EP2012/001215

§ 371 (c)(1),
(2), (4) Date: Dec. 23, 2013

(87) PCT Pub. No.: WO2012/139700

PCT Pub. Date: Oct. 18, 2012

(65) Prior Publication Data

US 2014/0097947 A1 Apr. 10, 2014

(30) Foreign Application Priority Data

Apr. 15, 2011 (DE) ........................ 10 2011 017 295
Feb. 27, 2012 (DE) ........................ 10 2012 003 910

(51) Int. Cl.
*G05B 11/01* (2006.01)
*G08C 19/12* (2006.01)
(Continued)

(52) U.S. Cl.
CPC ............... *G08C 17/02* (2013.01); *A63H 27/00* (2013.01); *A63H 30/04* (2013.01)

(58) Field of Classification Search
CPC ...... A63H 30/04; A63H 27/12; C08C 19/12; G11B 14/22; G08C 19/28; B64D 2700/6278; H04B 1/50
USPC ....... 340/12.5, 13.24-25, 4.11, 12.22, 12.23, 340/12.29, 425.5, 426.15, 7.46, 3.7; 446/37, 57, 456; 244/55; 370/278, 282
See application file for complete search history.

(56) References Cited

U.S. PATENT DOCUMENTS 5,177,765 A * 1/1993 Holland ............... H04B 1/7085 375/368
5,238,203 A 8/1993 Skonieczny et al.
(Continued)

FOREIGN PATENT DOCUMENTS

CN 101419461 A 4/2009
DE 3 437 297 4/1986
(Continued)

OTHER PUBLICATIONS

US Office Action for U.S. Appl. No. 13/147,475, dated Sep. 15, 2014, 28 pp.
(Continued)

*Primary Examiner* — George Bugg
*Assistant Examiner* — Munear Akki
(74) *Attorney, Agent, or Firm* — RatnerPrestia

(57) ABSTRACT

A system for the wireless control of an RC model, comprising a transmitting device separate from the RC model, a multifunctional device in the RC model, and a receiver model in the RC model. The transmitting device comprises a first transmitter for transmitting information via digital radio communication to the RC model, and a second receiver adapted to receive second information via digital radio communication from the RC model. The multifunctional device comprises or is connected to one or more electronic accessory modules. The receiver module is connected to or integrated with the multifunctional device, and comprises a first receiver configured to receive the first information and a second transmitter configured to transmit the second information. A method for using the system, a transmitting device suitable for use with the system, and a receiving device suitable for use with the system are also claimed.

22 Claims, 2 Drawing Sheets

(51) Int. Cl.

| | |
|---|---|
| ***B60Q 1/00*** | (2006.01) |
| ***G08B 5/22*** | (2006.01) |
| ***G05B 23/02*** | (2006.01) |
| ***G08C 17/02*** | (2006.01) |
| ***A63H 27/00*** | (2006.01) |
| ***A63H 30/04*** | (2006.01) |

(56) References Cited

U.S. PATENT DOCUMENTS

| | | | | |
|---|---|---|---|---|
| 5,299,759 | A | 4/1994 | Sherman et al. | |
| 5,322,469 | A | 6/1994 | Tilbor | |
| 5,597,138 | A | 1/1997 | Arlton et al. | |
| 5,749,540 | A | 5/1998 | Arlton | |
| 6,053,452 | A | 4/2000 | Yamakawa et al. | |
| 6,293,798 | B1 * | 9/2001 | Boyle .................... | G09B 9/048 434/29 |
| 6,439,956 | B1 * | 8/2002 | Ho .......................... | A63F 13/02 446/43 |
| 6,751,529 | B1 | 6/2004 | Fouche | |
| 6,804,511 | B1 * | 10/2004 | Kakinuma ............. | A63H 30/04 455/296 |
| 8,049,600 | B2 | 11/2011 | Beard et al. | |
| 2003/0043053 | A1 | 3/2003 | Schuckel | |
| 2004/0245378 | A1 | 12/2004 | Nonami et al. | |
| 2006/0058928 | A1 * | 3/2006 | Beard .................... | G05D 1/101 701/11 |
| 2006/0102777 | A1 | 5/2006 | Rock | |
| 2006/0264185 | A1 | 11/2006 | Jorgensen | |
| 2007/0030174 | A1 | 2/2007 | Randazzo et al. | |
| 2007/0032923 | A1 | 2/2007 | Mossman et al. | |
| 2007/0093945 | A1 | 4/2007 | Grzywna | |
| 2007/0162196 | A1 | 7/2007 | Nonami et al. | |
| 2008/0014833 | A1 * | 1/2008 | Bozzone ................ | A63H 30/00 446/454 |
| 2008/0036617 | A1 | 2/2008 | Arms et al. | |
| 2008/0097658 | A1 | 4/2008 | Shue et al. | |
| 2008/0249672 | A1 | 10/2008 | Cherepinsky | |
| 2008/0269988 | A1 | 10/2008 | Feller et al. | |
| 2008/0284613 | A1 * | 11/2008 | Beard .................... | A63H 30/04 340/3.1 |
| 2009/0012658 | A1 | 1/2009 | Cherepinsky et al. | |
| 2009/0242691 | A1 | 10/2009 | Wittmer | |
| 2009/0262002 | A1 | 10/2009 | Alexander | |
| 2010/0003886 | A1 | 1/2010 | Cheng et al. | |
| 2010/0004802 | A1 | 1/2010 | Bodin | |
| 2010/0023186 | A1 | 1/2010 | Sahasrabudhe et al. | |
| 2010/0210169 | A1 | 8/2010 | Röhr | |
| 2012/0169484 | A1 | 7/2012 | Röhr | |
| 2012/0330481 | A1 * | 12/2012 | Feldkamp ............... | G06F 17/00 701/2 |

FOREIGN PATENT DOCUMENTS

| | | |
|---|---|---|
| DE | 29805401 | 7/1998 |
| DE | 29810356 | 8/1998 |
| DE | 102007041563 | 3/2009 |
| GB | 1118117 | 6/1968 |
| WO | WO 96/06006 A1 | 2/1996 |
| WO | WO 2005/100154 A1 | 10/2005 |
| WO | WO 2008/048245 A2 | 4/2008 |

OTHER PUBLICATIONS

D. J. Walker, "Multivariable control of the longitudinal and lateral dynamics of a fly-by-wire helicopter," Control Engineering Practice, vol. 11, Issue 7, pp. 781-795 (Jul. 2003).

Rong Xie, et al., "H∞ State Feedback Control for the Stabilization of the Three Euler Angles of Helicopter Based on LMI," 2008 International Conference on Intelligent Computation Technology and Automation, pp. 375-379 (Oct. 2008).

Castillo, et al., "Small Scale Helicopter Analysis and Controller Design for Non-Aggressive Flights," 2005 IEEE Int'l Conf. on Systems, Man and Cybernetics, vol. 4, pp. 3305-3312 (Oct. 2005).

MikroKopter Flight-Ctrl V1.0 manual, May 2, 2007, 14 pages, www.MikroKopter.com; English translation, 18 pages, http://www.mikrokopter.de/ucwiki/en/FlightCtrlManual?action=print.

Spektrum DX7/AR7000 mit MK platine interfacen, 12 pages, http://forum.mikrokopter.de/topic-1144.html; Posts dated Jun. 8, 2007-Jan. 16, 2009, and English Translation, "Spectrum DX7/AR7000 with MK board interfacen," 16 pages, http://translate.google.com/translate; retrieved on Feb. 7, 2013.

RC Groups, "Getting PPM output from a Spektrum RX without any PPM stage," Posts dated Jul. 16, 2007-Aug. 22, 2009, 15 pages, http://www.rcgroups.com/forums/showthread.php2t=714299.

Thunder Tiger Europe GmbH, "Elektronische Rotorkopf-Stabilisierung für jedermann!" Thunder Tiger Newsletter Nov. 28, 2008, 1 page and English translation, 1 page.

AC-Helistore, "RONDO V2 Rotorkopf-Stabilisierung, Thunder Tiger," Feb. 10, 2010, 3 pages, and English translation, 1 page.

Adaptive Flight—Unmanned Aerial Vehicle Guidance, Navigation, and Control Systems, 1 page, http://www.adaptiveflight.com/news.html; News reports dated Sep. 2008-Mar. 5, 2009.

Holzapfel, Florian, "Nonlinear Adaptive Control of an Unmanned Aerial Vehicle," Jun. 8, 2004, 282 pages, and English Abstract, 2 pages.

HeliCommand Instruction Manual, Version 1.6, Dec. 2006.

Instruction Manual for the Pro RC Flybarless System, Jan. 2009.

US Office Action for U.S. Appl. No. 13,147,475, dated May 22, 2014, 32 pp.

ProRC, "Instruction Manual for the Pro RC Flybarless System Rondo," 26 pp., pdf file created Jan. 7, 2009, downloaded from: https://www.commonsenserc.com/RondoinstructionManualEnglish.pdf on May 16, 2014.

International Search Report for Application No. PCT/EP2010/000596, dated Oct. 21, 2010, 2pp.

U.S. Office Action for U.S. Appl. No. 12/698,665 mailed Oct. 10, 2012.

U.S. Office Action for U.S. Appl. No. 12/698,665 mailed Feb. 28, 2013.

U.S. Office Action for U.S. Appl. No. 12/698,665 mailed Jun. 17, 2014.

International Search Report for PCT/EP2012/001215 mailed Aug. 8, 2012.

Notice of Allowance for U.S. Appl. No. 13/147,475, dated Jan. 28, 2015, 15 pp.

* cited by examiner

SYSTEM, TRANSMITTING DEVICE, RECEIVING DEVICE, AND METHOD FOR THE WIRELESS CONTROL OF AN RC MODEL

CROSS REFERENCE TO RELATED APPLICATIONS

This application is a National Phase Application of International Application No.: PCT/EP2012/001215, filed Mar. 20, 2012, which claims priority to German Application Ser. No. 10 2011 017 295.5, filed Apr. 15, 2011, and German Application Ser. No. 10 2012 003 910.7, filed Feb. 27, 2012, all of the foregoing incorporated herein by reference.

FIELD OF THE INVENTION

The invention relates to a system for the wireless control of an RC model, including a transmitting device and a receiving device, as well as a method for the wireless control of an RC model.

BACKGROUND OF THE INVENTION

In the prior art, RC (Radio Control) transmitters are known, with which RC models can be controlled in a wireless manner, these RC transmitters, known per se, comprising, in addition to the control sticks for controlling the model and possibly other corresponding switches or sliders, possibly input means for inputting setting parameters, but, as a rule, these input means are restricted to determining in the RC transmitter a change of parameters, such as trimming values or shares of mixers and the like, e.g. via model memories.

On the other hand, electronic accessory modules (e.g. V-Stabi® of the company Mikado Helicopters, Germany), having an electronic attitude controller to be mounted in RC helicopters, are known, which are provided with a receiving device or can be connected with a corresponding receiving device (satellite receiver or receiver with a sum-signal output, such as, e.g., S-Bus®).

Radio communication between the RC transmitter and the receiving device in the RC model has been effected so far to a very great extent unidirectionally from the transmitter to the model, whereby exclusively control commands for controlling the model are transmitted, or possibly also individual control commands for setting parameters in the model, such as, for example, the sensitivity of a tail gyro, which in attitude controllers known per se can also be integrated in the electronics box of the attitude controller.

The attitude controller in the RC model has to be adjusted, e.g. for enabling its optimal functioning, by the user of the RC model (often "in the field") or else has to be configured, as required, during operation in conformity with personal preferences. This setting or configuration is usually effected by input means fixed directly on the attitude controller (push buttons, setting potentiometers and displays are known per se for this purpose) or by additional external operating parts which are connected to the electronics box via a line (e.g. a serial interface). Setting devices in which the connection line between the external operating part and the electronics box has been replaced by a Bluetooth® connection are also known. The external setting device, too, can in principle be replaced by a conventional mobile phone, a smartphone, a portable PC (notebook/netbook), a tablet computer or similar devices, in which case a corresponding setting software communicating with the Bluetooth® interface is available for setting.

It is the aim of the invention to make the setting and/or configuration of an electronic accessory module, such as, in particular, an attitude controller in an RC model, and possibly other accessory modules, more comfortable for the user or pilot of the RC model, doing to the greatest extent possible in particular without using an additional setting device or operating parts or display means fixed on the accessory module.

This problem is solved according to the invention by the system as claimed herein.

SUMMARY OF THE INVENTION

The system of the invention relates to the radio remote control of an RC model with the possibility to simultaneously operate the RC model in the sense of a setting/calibration of devices inside the controlled RC model, preferably RC model aircraft, in particular RC model helicopter, whereby both the setting/calibration and the operation are effected from a single novel combination device (e.g. RC transmitter with operating part) which communicate with a correspondingly suitable multifunctional device in the RC model via a bidirectional data connection.

Consequently, the invention relates to a system for the wireless control of an RC model with an operating and transmitting device for controlling and operating the model and with a receiving module in the RC model, the transmission of data preferably taking place via a bidirectional wireless radio communication. The transmitting device comprises a transmitting module for transmitting control commands and/or data via the digital radio communication. In the area of the RC model one or more electronic accessory modules, such as in particular an attitude controller, are arranged.

According to the invention, however, the transmitting device, too, comprises another receiving module for realizing the bidirectional radio communication, which is adapted at least for receiving data via the digital radio communication. The receiving module arranged in the RC model is connected with a multifunctional device. The receiving module can, however, also be integrated in the multifunctional device. Furthermore, a transmitting module is arranged in the RC model or in the multifunctional device, in order to establish the bidirectional radio communication serving for transmitting data receivable from the receiving module via the digital radio communication, the transmitting and receiving modules preferably being constructionally combined to form transceivers.

The digital radio communication is preferably utilized for at least one or more of the actions, individually or in combination with each other:

- transmitting signals for the operation of the RC model, such as, in particular, control commands,
- transmitting data from the transmitting device to the RC model for parameterizing accessory modules, such as, in particular, the multifunctional device,
- transmitting calibration data,
- transmitting program data, e.g. for a software update,
- transmitting data from the RC model to the parameter display of the transmitting device,
- transmitting status information from the RC model to the transmitting device,
- transmitting fault diagnosis data, preferably from the RC model to the transmitting device.

Preferably, the data and/or parameters of the multifunctional device or of the receiving module or other electronic devices connected to the multifunctional device are in this case transmitted via the digital radio communication.

According to a preferred embodiment of the invention, the multifunctional device comprises an attitude controller for controlling and/or influencing and/or automatically controlling the attitude of an RC model. That means that the attitude controller and the means for value calibration via the bidirectional radio communication are integrated in a common housing or on a common construction unit (e.g. on a printed circuit board or a printed-circuit-board arrangement). The means for transmitting and receiving are not necessarily so integrated. It is in principle possible and in the sense of the invention that the means for sending and receiving are arranged separately from the multifunctional device and are electrically connected therewith. Expediently, however, the means for transmitting and receiving are also integrated in the multifunctional device in the above-mentioned sense.

For simple systems, it is provided, according to an alternative preferred embodiment, that the multifunction module does not comprise an attitude controller but only contains the transmitting and receiving modules for bidirectional communication with the transmitting device as well as interfaces for communication (e.g. data exchange and/or setting/calibration) with further devices, such as, for example, a separately arranged attitude controller which is connected with the multifunctional device. This arrangement is, however, less expedient, because it is exactly the most preferred integration of the attitude controller in the multifunctional device which offers a space-saving and cost-advantageous realization of the system according to the invention.

Preferably, the digital radio communication operates on the spread-spectrum principle known per se (e.g. DSSS or FHSS or a combination of the two), in particular in the range of 2.4 GHz. For corresponding radio communications, various protocols are known and common, such as, for example, Futaba FASST® or Horizon Hobby Spektrum®. In this context, duplex systems setting up a bidirectional connection (e.g. Jeti Duplex 2.4 GHz) have also become known.

The digital radio communication used according to the invention is preferably an at least partly protected data connection. In this way, an unauthorized or unintended access to the multifunctional device or the RC model can be prevented, among others.

Particularly preferably, the digital radio communication comprises a share of protected data (useful data) and a share of unprotected or only partly protected data (channel data). In this way, it is possible to ensure the necessary performance profile of the data connection, as required, which leads to a quasi latency-free transmission of the control data with little jitter as well as a loss-free data transmission. Furthermore, it is possible to protect at any given moment only those data for which a protection is necessary or useful. For the transmission of the channel data of the control channels, it is expedient, instead of a protection, to simply continuously transmit the current value of the channel (e.g. stick position of the control stick) without any protection, because the channel data continuously assume new values and will, therefore, be obsolete after a short time already.

Preferably, the useful data, which may be used, for example, for streaming, are protected, contrary to the channel data.

According to a preferred embodiment, the transmitting device comprises display means (e.g. for displaying setting values) and input means for a user dialog to carry out the above-described actions. For the input of data or setting of values, the control sticks provided for the control of the RC model can expediently be used in addition to the usually applied input means, such as push-buttons, knobs, switches or rotary controllers. For this purpose, the transmitting device will in that case contain a program which detects the control positions of the control stick and converts them into data values.

The multifunction module preferably includes electrical connectors for the connection of a separate transmitting/receiving module. This is, however, not necessary as a rule, because according to another preferred embodiment, the multifunction module includes an integrated receiver, in particular, a transceiver. It is, therefore, also imaginable to omit this additional connector.

Furthermore, the multifunction module preferably includes one or more connectors for RC servos and in particular, at least one connector for an external sensor device, such as in particular a 3-axis gyro sensor and/or other sensors. For example, speed sensors or phase sensors are considered as other sensors. By phase sensor, one understands an electronics with which a motor connector of an electric motor (e.g. a brushless motor driven via three phases) is sensed in order to determine the motor speed. However, pressure sensors, acceleration sensors and voltage sensors, etc., are also imaginable.

The multifunctional device furthermore preferably comprises a parameter monitoring device (e.g. for monitoring the supply voltage or the used-up capacity of an accumulator for operating the RC model).

According to a preferred embodiment, the system includes a device with which the system will automatically set up a radio communication if one or more suitable devices to be programmed according to the above-mentioned actions are within reach. In this case, corresponding means are provided in the transmitting and receiving device for that purpose. Particularly preferably, the operator dialog offers in this case a choice of the accessory module(s) and/or receiver(s), allowing to select the device or receiver to be connected.

According to a preferred embodiment of the invention, the radio communication of the system comprises an access protection, in order to prevent an unauthorized or unintended access to the multifunctional device or RC models (protected radio communication). In the simplest case, this access protection can be realized, for example, through a password prompt or an access-code prompt. Expediently, the password or access code is permanently stored in the system. It is particularly expedient that the password can be changed with the transmitting device for the overall system if a protected radio communication is already given.

According to another preferred embodiment, the radio communication allows an immediate online feedback of data or parameters, in particular in case of a transmitter-side change of the data or parameters of the accessory module(s), in particular of the multifunctional device (so-called online operation).

It is expedient, not only for effecting the above-described online setting, that the set data, parameters or calibration values are permanently stored (even without operating voltage) in a memory of the multifunctional device. In principle, a storage in the transmitting device is alternatively also advantageous, in particular also additionally.

The transmitting device preferably comprises a display for showing status reports, error messages, parameters, and at least one input means for setting the parameters or data.

The transmitting device expediently comprises a memory for storing data, parameters or calibration values. Preferably, the operating program for the transmitting device can also be stored for the purpose of an update thereof. The storage allows in a particular advantageous manner to additionally store operating programs for the devices which wirelessly communicate with the system, such as in particular the multifunctional device.

According to a development of the invention, the transmitting device also comprises means for storing data, such as, for example, a slot for a memory card, USB connection, Internet connection, or the like.

The transmitting device preferably comprises a display facilitating the menu guidance through a tree structure (similar to Windows Explorer).

The invention also relates to a transmitting device (for example, an RC transmitter) having the preferred features according to the invention, which are associated with the transmitting device, of the above-described system.

The invention also relates to a receiving device having the preferred features according to the invention, which are associated with the receiving device, of the above-described system.

Finally, the invention also relates to a method for the wireless control of an RC model, in particular an RC model aircraft, with a transmitting device, wherein the transmitting device transmits control commands and/or data via a digital radio communication to the RC model for controlling the RC model, wherein, furthermore, data of an electronic accessory module arranged in the region of the RC model are transmitted via the digital radio communication to the transmitting device, and wherein the digital radio communication is utilized for at least one or more of the actions, individually or in combination with each other:

- transmitting signals for the operation of the RC model, such as, in particular, control commands,
- transmitting data from the transmitting device to the RC model for parameterizing accessory modules, such as, in particular, the multifunctional device,
- transmitting calibration data,
- transmitting program data, e.g. for a software update,
- transmitting data from the RC model to the parameter display of the transmitting device,
- transmitting status information from the RC model to the transmitting device,
- transmitting fault diagnosis data, preferably from the RC model to the transmitting device.

BRIEF DESCRIPTION OF THE DRAWINGS

Further preferred embodiments result from the dependent claims and the following description of an exemplary embodiment by means of figures, in which

DETAILED DESCRIPTION OF THE INVENTION

Figure 1:
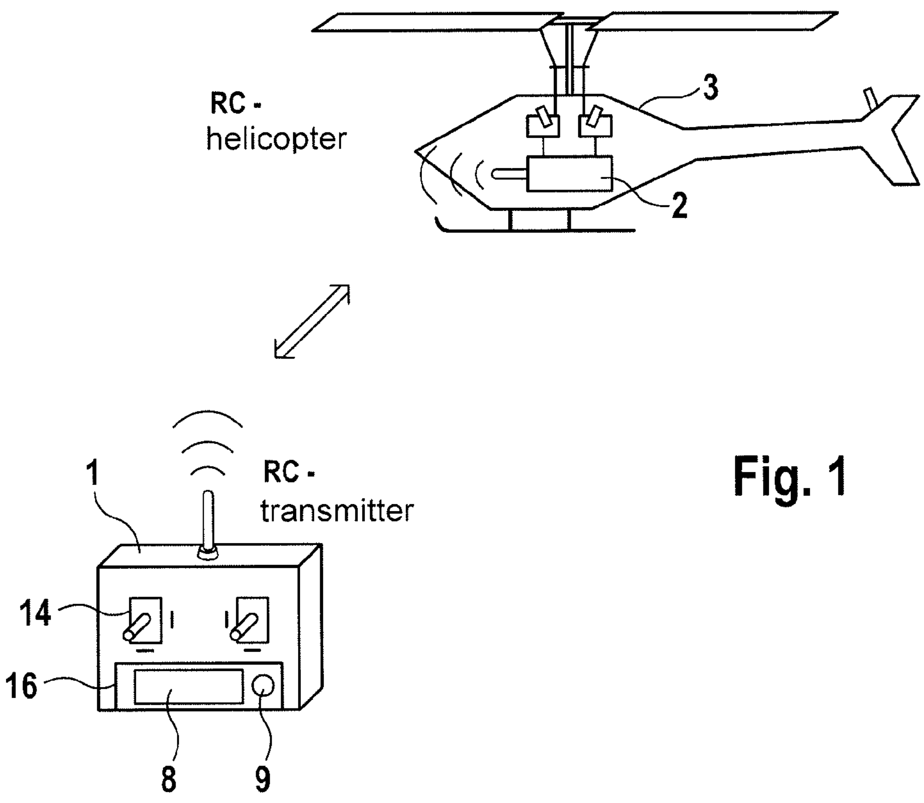
FIG. 1 shows an RC transmitter according to the invention and an RC model helicopter controlled by the transmitter in a wireless manner.

In FIG. 1, the transmitting device 1 primarily serves for the conventional control of an RC model helicopter 3, as is usual in the field of RC model flights. It is already known and common to equip RC model helicopters with attitude controllers (e.g. V-Stabi®), which imitate or replace, through the use of an attitude controller, the effect of a mechanical stabilization, such as it is produced by so-called Bell-Hiller paddles (auxiliary rotor). Helicopter attitude controllers, such as V-Stabi®, have, among others, the advantage that the flight properties of the RC model can be adapted in a wide range to the requirements of the pilot controlling the helicopter with the transmitting device 1. Furthermore, as a rule, the expenditure for a mechanical stabilization can be omitted, which offers optical and functional advantages.

The digital radio communication is provided by a wireless bidirectional and at least partially protected data communication, which will be explained in more detail below.

The RC transmitter 1 comprises transmitter operating elements 14 for operating and/or controlling and/or trimming the RC model 3.

The parameter display 8 serves, for example, for displaying the set parameters or different kinds of information, such as status information, calibration data, diagnostic data, etc.

The parameter input device 9 serves for inputting or setting parameters, setting values, etc.

The parameter input device 9 and the parameter display 8 can be combined in a common operating device 16 for an operator dialog.

Figure 2:
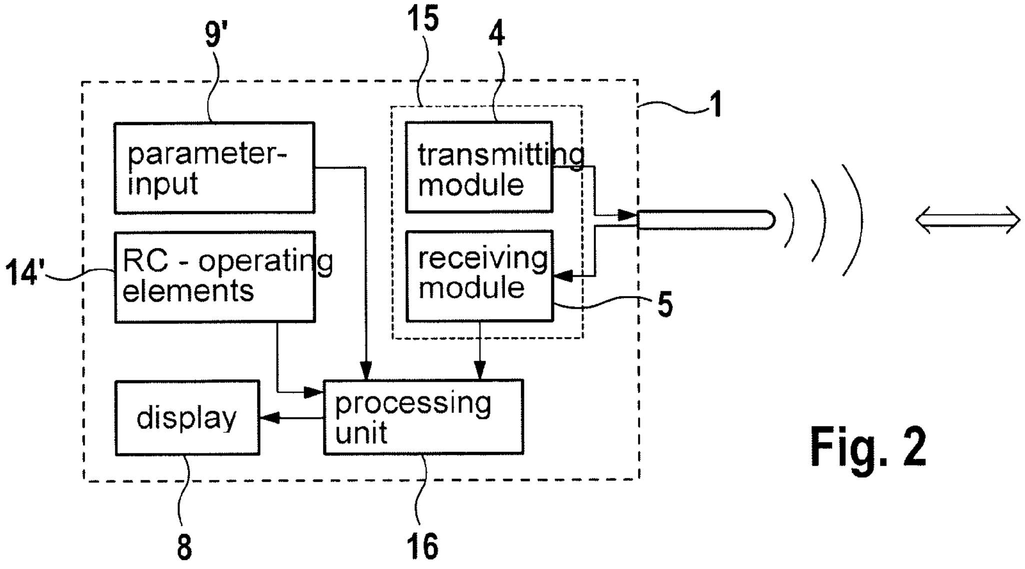
FIG. 2 is a schematic representation of the most important components of the RC transmitter according to the invention and FIG. 3 is a schematic representation of the most important components of the multifunctional device according to the invention.

As can be seen in FIG. 2, the RC transmitter 1 comprises a control-processing module 14' for processing the signals of the operating elements 14 provided essentially for controlling and/or trimming of the RC module.

The parameter input module 9' processes the values made available by the parameter input device 9.

The transmitting module 4 and the receiving module 5 can advantageously be combined in a common transceiver 15. The processing unit 16 preferably comprises a microcontroller and processes the signals in the transmitting device 1. Processing is preferably controlled by a software program which is preferably update-enabled. For this purpose, the transmitting device 1 can include a connector for a data cable and/or a slot for a storage module. A wireless update of the operating software can also be provided, either via an additional interface module, such as, e.g., a Bluetooth® module, or else via the transmitting and receiving device which is available anyhow.

According to a alternative exemplary embodiment of the invention, a WLAN radio communication can be used instead of a Bluetooth® communication.

Figure 3:
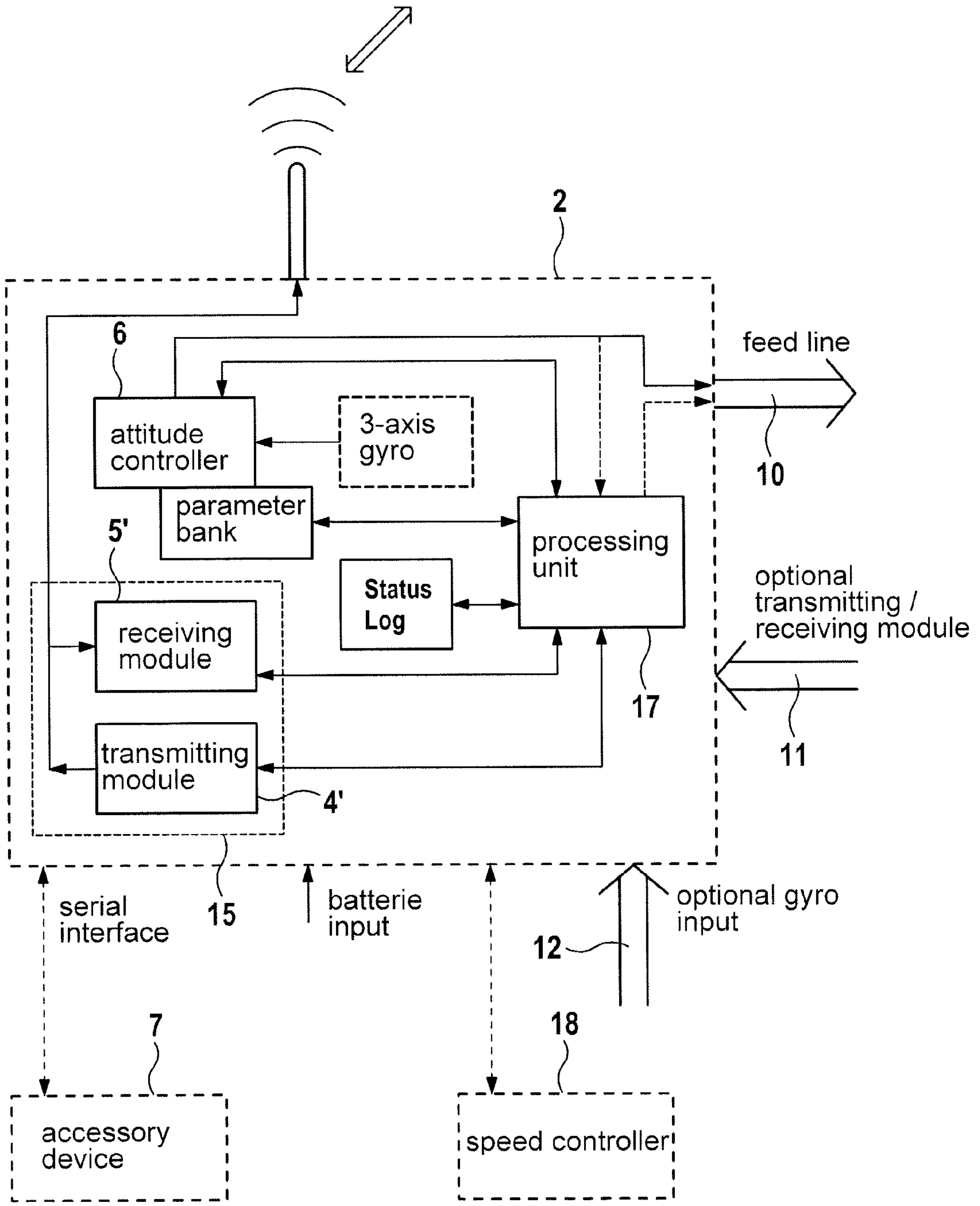

FIG. 3 shows the electronics box 2 with the attitude controller 6, which integrates in one housing a multitude of control and analysis functions (e.g. attitude controller, speed controller, on-board voltage monitoring, vibration analysis, etc.) useful for the pilot, which are nowadays accommodated in separate boxes. Instead of the receiving module 5' and the transmitting module 4', a transceiver 15 can be used, in which the transmitting module and the receiving module are combined in a common module. The signals are processed in the multifunctional device or else in the electronics box 2 by the processing unit 17, which also comprises in particular a microcontroller with a suitably designed software program which is preferably update-enabled via a software download. For this purpose, the multifunctional device 2 can include a connector for a data cable and/or a slot for a storage module. A wireless update can also be provided, either via an additional interface module, such as, e.g., an integrated or connectable Bluetooth® module, or else via the transmitting and receiving device which is available anyhow.

Further accessory devices 7 can be connected to the multifunctional device 2, if necessary, via one or more serial interface(s). It is advantageous that in this case, too, the multifunctional device 2 can affect the configuration of the accessory device 7 or the data transmission from the device 7 back to the transmitter. A speed controller 18 can also be connected to the multifunctional device 2. The speed controller 18 can expediently be integrated completely, or else only the logics for the speed controller can be integrated in the multifunctional device 2.

The multifunctional device 2 preferably comprises additional sensor inputs for additional sensors, such as, for example, an input for a speed sensor or a phase sensor (electronic tapping of a motor phase of an electric drive motor of the RC model).

The electronic accessory module (additional device 7) in the area of the RC model can also be connected to the receiving device of the RC model for the above-mentioned purposes only, without the connection serving any further purpose.

In the, at least partially protected, digital radio communication, data packets are transmitted in the 2.4-GHz band, the radio communication functioning according to the frequency-hopping method, which corresponds to the current state of the art in the field of RC model construction. The possibility of transmitting data packets via a 2.4 GHz radio communication is widely known in the state of the art. For the realization of the invention, however, this technique has been developed in such a way that it is possible to bidirectionally transmit the control channels (control data) and useful data (e.g. the setting values for flight-data regulation) via the radio communication. For this purpose, the exemplary digital radio communication consists of a protected bidirectional share of the useful data and a non-protected, in particular unidirectional, connection for the control channels. The connection for the control channels shows a deterministic runtime performance in the same packet stream, whereby, depending on requirements, the necessary performance profile of the communication can be ensured.

In the frequency-hopping method applied, each data packet is transmitted on a different frequency. Each packet with which a number of data bytes is transmitted from the transmitter to the receiver or from the receiver to the transmitter contains, in a substructure, the complete control channels necessary for the control (4 main channels plus 8 switching channels) as well as a key for the protected transmission. The transmission of the control channels (stick and additional channels) utilizes only part of the byte positions available in a packet as total number of transmittable bytes. The remaining part of a packet is used for transmitting setting and evaluating data. These data are supplemented by a protocol with acknowledgments and sequential numbers. To protect the data, parity information or repetitions (e.g. similar to TCP=Transport Control Protocol) can be transmitted. Expediently, a check-data protection, known per se, on the hardware level of the transceivers is utilized, together with an additional protection on the level of the application program. That means that a real-time-enabled share of control data is bundled with a data-protection protocol.

It has, furthermore, turned out to be particularly advantageous for a safe data communication that the transmitted data are repeated until the receiver (the transmitting device 1 or the transceiver in the attitude controller 6, depending on the data flow direction) acknowledges proper receipt by means of an "okay" signal. This protection effected on the application level is carried out in addition to the data protection on the physical level of the transceivers.

Another advantageous aspect of the invention consists in the fact that it is possible to segment the bandwidth, as required, from the transmitter to the receiver or from the receiver to the transmitter. This can be realized in a particularly expedient manner through a mask or a window which determines the times at which a transmission in the corresponding direction is allowed to take place. More precisely, in order to increase the bandwidth, it will then be admitted in one data flow direction, as required, to transmit several data packets until an "okay" acknowledgment is given. This technique is known per se in the field of transmission control protocols (TCP: "Transmission Control Protocol") and allows that both transmitter and receiver leave a certain window open for the packet numbers. Thus, all data within this window can be transmitted in any order. In the receiver, the packets will then be re-composed in the correct order. The window will float to higher numbers when everything in that window has been processed. In this way, the transmitter can send several packets before waiting for an acknowledgment. In particular in case of a bad connection, the risk of an invalid transmission increases. This technique leads to an altogether clearly improved robustness of the communication against data loss or complete failure.

It is, furthermore, preferable to provide the data packets with sequential numbers, thus enabling the streaming of data via the digital radio communication (advantageous, e.g. for a data download).

Furthermore, it has turned out to be expedient to encode the transmitted control channels and/or useful data additionally according to an encoding method known per se, to protect the radio transmission against unauthorized access.

The invention claimed is:

1. A system for the wireless control of a radio controlled (RC) model, the system comprising:

a transmitting device separate from the RC model comprising a first transmitter configured to transmit first information via digital radio communication to the RC model, a second receiver adapted to receive second information via digital radio communication from the RC model, and a user interface for manipulation by a user to generate control command signals for operation of the RC model;

the RC model, comprising:

a multifunctional device comprising or connected to one or more electronic accessory modules and having access to a memory located on the RC model for storing data values; and a receiver module connected to or integrated with the multifunctional device, the receiver module comprising a first receiver configured to receive the first information and a second transmitter configured to transmit the second information;

wherein said first transmitter is configured to transmit in a single transmission first information comprising one or more protected data packets and one or more non-protected data packets:

said one or more non-protected data packets configured for a unidirectional control protocol and containing said control command signals, and said one or more protected data packets configured for a bidirectional control protocol and containing (i) data for parameterizing the multifunctional device or the one or more electronic accessory modules, and (ii) information relating to a data-protection protocol, and wherein the second transmitter is configured to transmit second information comprising both (i) immediate feedback corresponding to any changes in the data for parameterizing the multifunctional device or accessory modules received from the first transmitter in a first transmission, and (ii) data corresponding to the data values stored in the memory.

2. The system of claim 1, wherein the first and/or second information further comprises, individually or in combination with each other, information related to an action selected from the group consisting of:

transmission of signals for the operation of the RC model, including control commands;

transmission of data from the transmitting device to the RC model for parameterizing the multifunctional device or one or more accessory modules;

transmission of calibration data;

transmission of program data, including for a software update;

transmission of data from the RC model to a parameter display of the transmitting device;

transmission of status information from the RC model to the transmitting device; and transmission of fault diagnosis data, including from the RC model to the transmitting device.

3. The system of claim 2, wherein the transmitting device further comprises display means and user input means configured to permit operator interaction with the transmitting device to cause performance of one or more of the actions.

4. The system of claim 3, wherein the system is configured (a) to automatically establish radio communication between the transmitting device and the receiver module when within an effective signal range and (b) to permit a user to select a unit to which to connect.

5. The system of claim 1, wherein the multifunctional device comprises an attitude controller for controlling or influencing attitude of the RC model.

6. The system of claim 1, wherein the digital radio communication comprises spread-spectrum digital communication.

7. The system of claim 1, wherein the multifunctional device comprises electrical connectors for connection to the receiving module, wherein the receiving module is separate from the multifunctional device.

8. The system of claim 1, wherein the multifunction module comprises one or more connectors for RC servos and at least one connector for an external sensor device.

9. The system of claim 8, wherein the external sensor device comprises a 3-axis gyro sensor.

10. The system of claim 1, wherein the transmitting device further comprises:

a display configured to show status reports, error messages, and parameters; and an input means for setting parameters or data.

11. The system of claim 1, wherein the multifunctional device comprises a parameter monitoring device.

12. The system of claim 1, wherein the transmitting device comprises a display configured to facilitate menu guidance through a tree structure.

13. The system of claim 1, wherein the first transmitter and the second receiver comprise a first transceiver, the second transmitter and first receiver comprise a second transceiver, or a combination thereof.

14. A combination transmitting and receiving device for use in a system for wireless control of a radio controlled (RC) model, the device comprising a first transmitter for transmitting first information via digital radio communication, a second receiver adapted to receive second information via digital radio communication, and a user interface for manipulation by a user to generate control command signals for operation of the RC model, the first transmitter configured to transmit the first information to a first receiver disposed in the RC model and the second receiver configured to receive information from a second transmitter disposed in the RC model, wherein said first transmitter is configured to transmit in a single transmission first information comprising one or more protected data packets and one or more non-protected data packets:

said one or more non-protected data packets configured for a unidirectional control protocol and containing said control command signals , and said one or more protected data packets configured for a bidirectional control protocol and containing (i) data for parameterizing the multifunctional device or the one or more electronic accessory modules, and (ii) information relating to a data-protection protocol, and wherein said second receiver is configured to receive second information from said second transmitter comprising at least immediate feedback corresponding to both (i) any changes in the data for parameterizing the multifunctional device or accessory modules received from the first transmitter in a first transmission, and (ii) data corresponding to data values stored in a memory located on the RC model.

15. A method for wireless control of a radio controlled (RC) model using the system of claim 1, comprising the steps of:

(a) transmitting control commands and/or data for the control of the RC model via a digital radio communication to the RC model using the combination transmitting and receiving device in the first transmission; and (b) transmitting data corresponding to at least one of the multifunctional device or the one or more electronic accessory modules via digital radio communication to the combination transmitting and receiving device in a second transmission wherein said data in step (b) includes the immediate feedback corresponding to the data sent in step (a), and wherein the digital radio communication in at least one of step (a) or (b) comprises one or more actions, individually or in combination with each other, from the group consisting of:

transmitting signals for the operation of the RC model, including control commands;

transmitting data from the transmitting device to the RC model for parameterizing the multifunctional device or one or more accessory modules;

transmitting calibration data;

transmitting program data, including for a software update;

transmitting data from the RC model to a parameter display of the transmitting device;

transmitting status information from the RC model to the transmitting device; and transmitting fault diagnosis data, including from the RC model to the transmitting device.

16. The method of claim 15, wherein the actions comprises a module parameter setting, and the method further comprises modifying the module parameters during operation of the module, and displaying values of the changed parameters, data depending on the changed parameters, or a combination thereof, within range of the transmitter.

17. The method of claim 15, comprising transmitting both data and control commands from the transmitting device to the first receiver.

18. The method of claim 17, wherein said first transmission comprises said data for parameterizing the multifunctional device or the one or more electronic accessory modules in combination with one or more said control commands.

19. The method of claim 17, wherein first transmission comprises data for parameterizing the multifunctional device or the one or more electronic accessory modules not in combination with any said control commands.

20. The system of claim 1, wherein the first transmitter and the second receiver are located together in a single housing.

21. The system of claim 1, wherein the first transmitter, the second receiver, and the user interface are located together in a single housing.

22. The system of claim 1, wherein the user interface comprises a stick controller and the command control signals comprise stick input signals.

* * * * *